INVENTOR.
ROBERT M. BOEHME
BY Fred Jacob
ATTORNEY.

Dec. 10, 1968   R. M. BOEHME   3,414,971
METHOD OF FABRICATING READ-AFTER-WRITE HEADS
Filed June 9, 1964   5 Sheets-Sheet 2
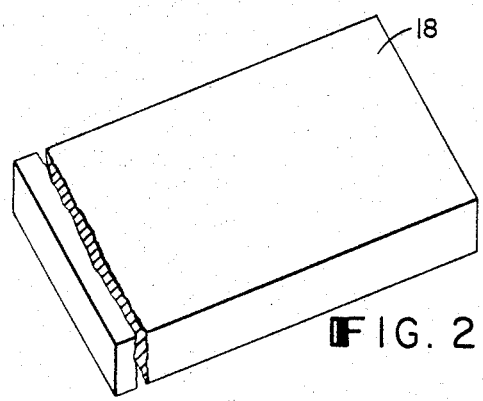
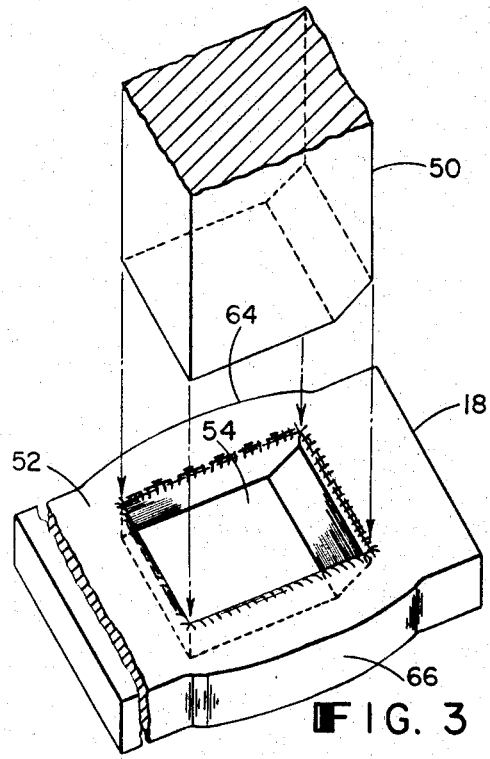
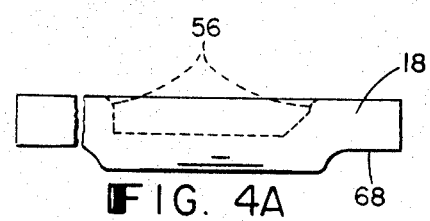
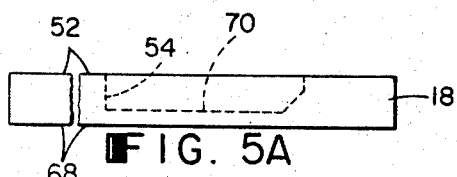
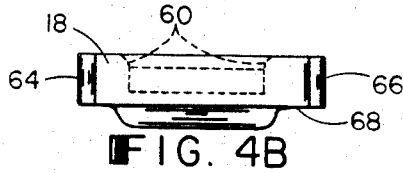
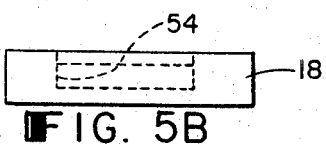
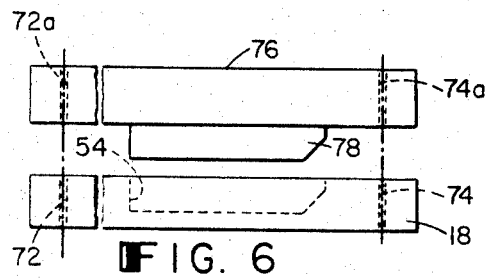
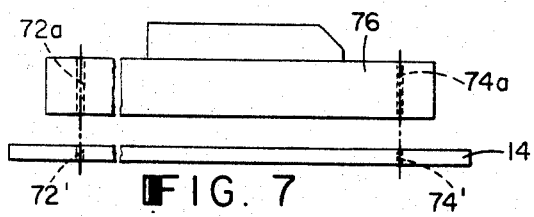
INVENTOR.
ROBERT M. BOEHME
BY
*Fred Jacob*
ATTORNEY.

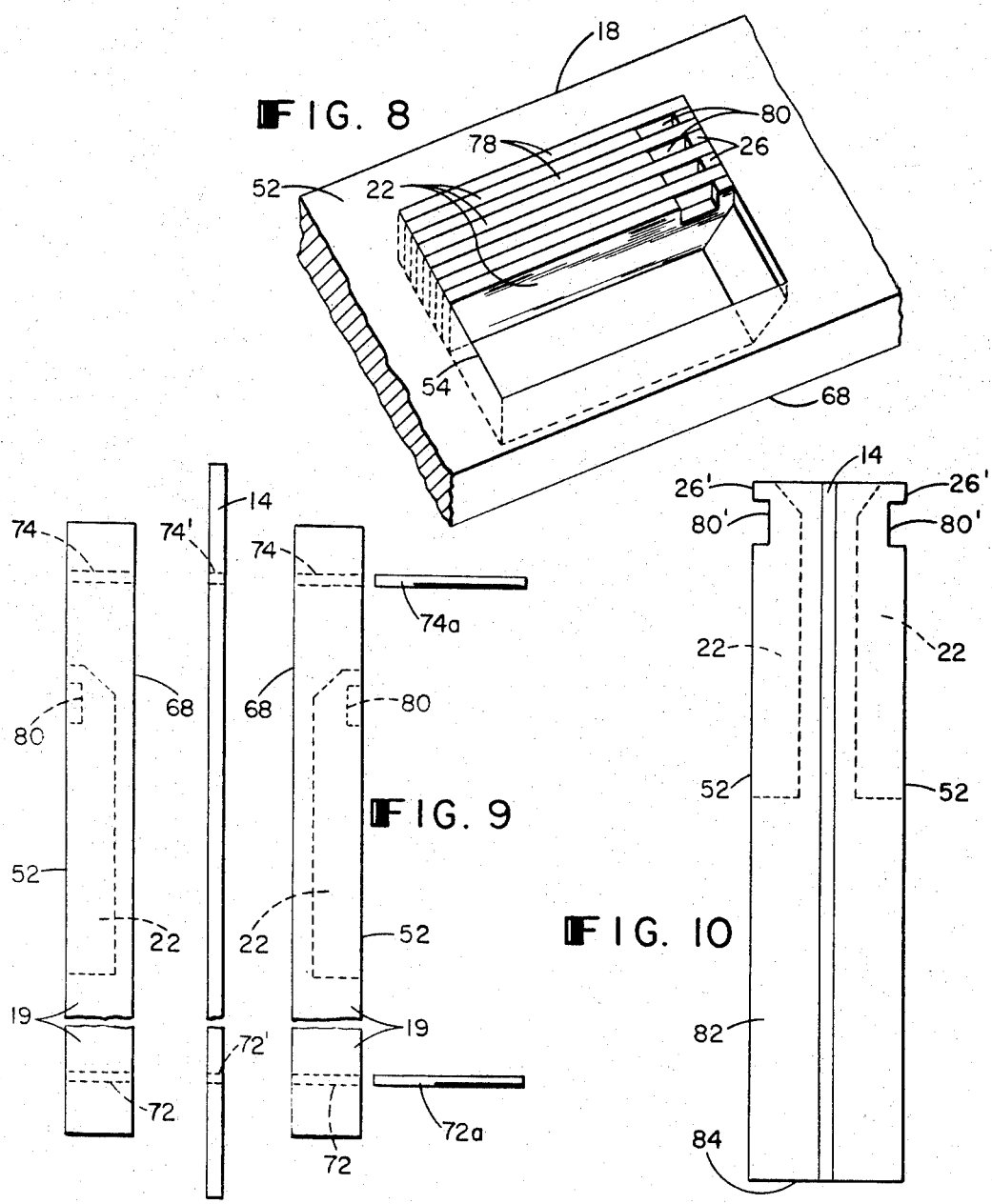

INVENTOR.
ROBERT M. BOEHME
BY Fred Jacob
ATTORNEY.

Dec. 10, 1968   R. M. BOEHME   3,414,971
METHOD OF FABRICATING READ-AFTER-WRITE HEADS
Filed June 9, 1964   5 Sheets-Sheet 5

INVENTOR.
ROBERT M. BOEHME
BY *Fred Jacob*
ATTORNEY.

United States Patent Office 3,414,971
Patented Dec. 10, 1968

3,414,971
METHOD OF FABRICATING READ-AFTER-WRITE HEADS
Robert M. Boehme, Cambridge, Mass., assignor to Honeywell Inc., a corporation of Delaware
Filed June 9, 1964, Ser. No. 373,738
13 Claims. (Cl. 29—603)

ABSTRACT OF THE DISCLOSURE

A method of fabricating a dual magnetic head wherein at least the return core head sections include metal blocks which are stamped to provide cavities having side wall and bottom surfaces which accurately conform to the configuration of the corresponding core portions. The blocks are machined to size and the return core portions are stacked in each cavity, interleaved with cross-talk shields, to form respective return core head sections. By the use of indicia, pre-formed on each block and positionally referenced to the stamped cavity, the aforesaid head sections are mutually aligned in back-to-back relationship, with a shield placed between them. They are thus joined into a double head section, which is further assembled with a pair of wound core head sections and a gap spacer positioned between each set of confronting pole faces to form the dual magnetic head.

---

The present invention relates in general to a new and improved method of fabricating magnetic heads, in particular to a method of fabricating a read-after-write double head configuration.

In order to insure the reliability of data transfer to a magnetic storage medium, a check is customarily made wherein the transferred data, or a related quantity, is compared to the original data or to a standard. In the case of a high-speed magnetic tape drive or a drum, such a check is sometimes carried out by reading the transferred data immediately after it has been recorded and comparing it. To this end, a double head configuration may be employed wherein the read head, which has the same number of cores as the write head, is positioned in mirror-image relationship a fixed distance behind the latter in the direction of motion of the magnetic medium. In order to prevent crosstalk between cores of the two heads which do not correspond to the same channel of the magnetic medium, the two heads are positioned so that the center lines of the corresponding cores, which coincide with the center lines of the respective data channels of the magnetic medium, are aligned with each other.

In a multi-channel recording arrangement it is further important to provide shielding between the respective cores of each head in order to limit inter-channel crosstalk with respect to a single head. Such crosstalk may occur due to flux fringing in the vicinity of the gaps which are aligned transverse to the direction of the motion of the medium in each multi-channel head. Of even greater importance is the provision of shielding between the respective heads to prevent the transfer of data therebetween. Such data transfer, which is also due to flux fringing, may cause spurious data to be recorded.

The techniques presently in use for fabricating the aforesaid double head configuration generally require each head to be built up from a pair of head sections, each head section including a non-magnetic, metallic supporting structure wherein identical core portions are held interleaved with inter-channel shields. The comb-like supporting structure may have built-up sides and bottom and separate machined slots, each conforming to the outline of the cores and of the inter-channel shields which are alternately held therein. A modification of the foregoing construction may comprise shields which exceed the cores in size and which, upon being inserted in the slots, form their own comb-like construction in conjunction with the supporting structure to hold the cores therebetween.

The fabrication of the aforesaid supporting structures is clearly an expensive process which requires a great deal of intricate precision machining. It is obvious that the slots which hold the cores must be parallel if the recorded data channels are to be parallel. The interior slot walls must, moreover, accurately conform to the outline of the core portions held therein so that the pole faces of the latter, which face the corresponding pole faces in the mating head section, will be parallel to each other when assembled and the same amount of metal is removed from each core during the machining of the common pole face surface. In addition, the center-to-center spacing of the respective core portions must not only be uniform and identical in the mating pair of head sections, but it must also be identical to that of the other head in the double head configuration, so that the two heads can be aligned with each other.

As previously explained, shielding must be provided between the two heads of the double head configuration. The presence of such an interhead shield, together with those portions of the supporting structures which appear immediately adjacent both sides of the shield, materially increases the difficulty of aligning the two heads with each other during assembly. This is due to the fact that the cores which must be aligned with each other are not in direct contact so that a visual comparison is not readily carried out. A further obstacle to precise head alignment stems from the fact that the cores of the write head, which may have a width of the order of 48 mils, are usually wider than those of the read head whose cores may, for example, be only 35 mils wide. The precise alignment of corresponding cores of the respective heads along their center lines is of the utmost importance if an effective read-after-write check is to be carried out. In presently used fabrication technique, compliance with this requirement materially increases the cost of manufacture of the double head configuration, as well as the time required to do so. Moreover, such precise alignment is rarely consistently attainable on a mass production basis so that the reliability of the equipment wherein the double head configuration is used is adversely affected.

Accordingly, it is the primary object of the present invention to provide a method for fabricating a read-after-write head configuration which overcomes the foregoing disadvantages.

It is another object of the present invention to provide a simple and rapid method for fabricating a read-after-write head configuration which is relatively inexpensive to carry out.

It is a further object of the present invention to provide a simple and inexpensive method of fabricating a read-after-write head configuration to sufficiently close tolerances to provide reliable operation in use.

It is an additional object of the present invention to provide a method of consistently fabricating a double head configuration to predetermined tolerances which is applicable to mass production techniques.

Further objects of the present invention, together with the features and advantages thereof, will become apparent from the following detailed specification with reference to the accompanying drawings in which:

FIGURE 2 illustrates the metal stock from which the supporting structure is made;

FIGURE 3 illustrates the stamping operation for providing a cavity to hold the core portions;

FIGURE 4 illustrates the stamped piece;

FIGURE 5 illustrates the supporting structure following machining;

FIGURE 6 illustrates the provision of locating indicia in the supporting structure;

FIGURE 7 illustrates the provision of locating indicia on the inter-head shield;

FIGURE 8 illustrates the step of stacking cores and shields in alternation in the cavity of the supporting structure;

FIGURE 9 illustrates the assembly of a pair of head sections into a double head section;

FIGURE 10 illustrates the double head section after machining;

Figure 1A:
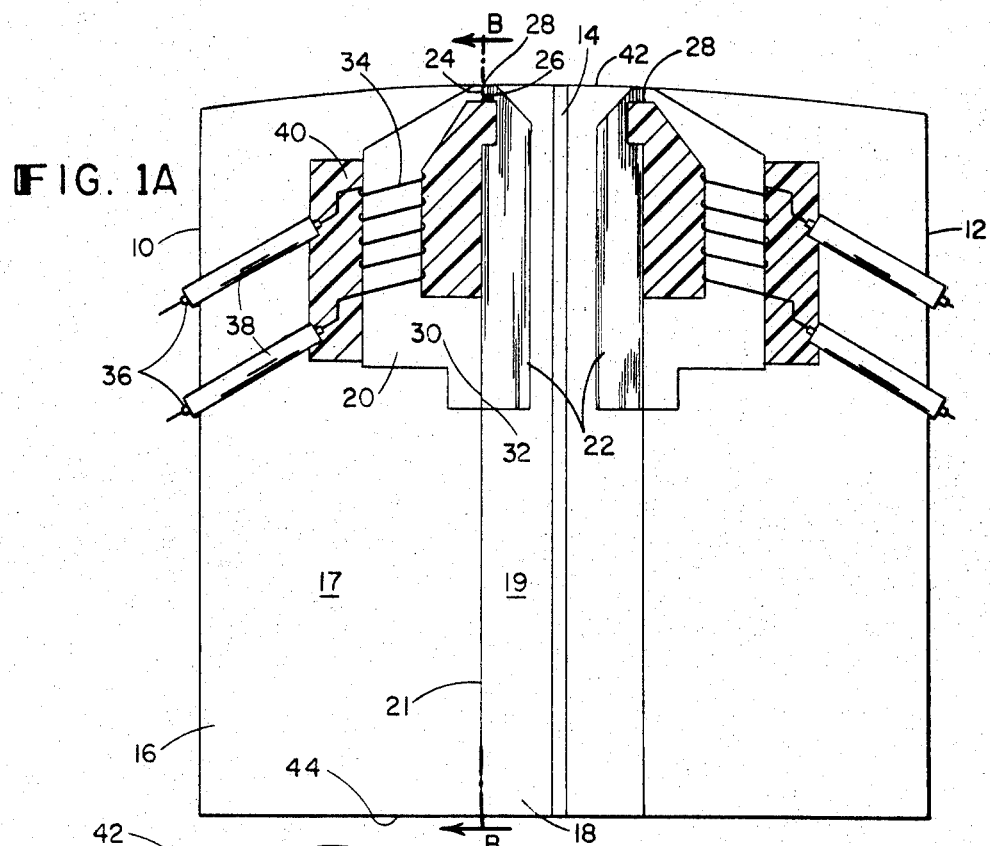
FIGURE 1 illustrates in cross-section a preferred embodiment of a read-after-write head.

With reference now to the drawings, FIGURE 1a is a cross-sectional view of a read-after-write head configuration. The double head configuration is seen to consist of a write head 10 and a read head 12 which are substantially alike so that each reference numeral in the drawing is applicable to both heads. The heads are positioned in back-to-back relationship on opposite sides of an inter-head shield 14 with the gaps 28 of the respective heads having a predetermined spacing. The inter-head shield may consist of laminations of Mumetal and laminations of a non-magnetic, high-conductivity metal, e.g. an aluminum alloy, in a preferred embodiment of the invention. Each head, such as the write head 10, includes a pair of head sections 17 and 19 with respective supporting structures 16 and 18 which abut each other in a common plane 21. The supporting structures may consist of an aluminum alloy such as No. 6061, in the preferred embodiment of the invention.

The head section 17 further includes a C-shaped core portion 20 which is held in a conforming cavity of the supporting structure 16. The head section 19 includes an I-core or return core portion 22 which is similarly positioned in the supporting structure 18. The core portions themselves may consist of laminations of Mumetal having a high permeability. Each pair of mating core portions terminates in a pair of pole faces 24 and 26 between which a gap spacer is positioned to define the gap 28. The gap spacer, which may consist of mica or some other suitable non-magnetic material, has a thickness of a fraction of a mil and is seen to lie in the common plane 21.

The base of the C-shaped core portion 20 terminates in a surface 30 which lies in the common plane 21 and abuts a surface 32 of the return core portion 22. The core portion 20 further carries a winding 34 whose ends are threaded through a pair of brass sleeves 36, each of which is surrounded by an insulating jacket 38 that is positioned in the supporting structure 16. The space between the mating core portions, as well as between the latter and the supporting structures, contains a potting compound 40 to fill up all voids within the double head configuration. In the preferred embodiment of the invention, the heads 10 and 12, as well as the intermediately positioned shield 14, terminate at the top in a common arcuate surface 42 which exposes the gaps of both heads and which is adapted to be presented to a magnetic recording medium. The bottom end of the double head configuration terminates in a common planar reference surface 44.

Figure 1B:
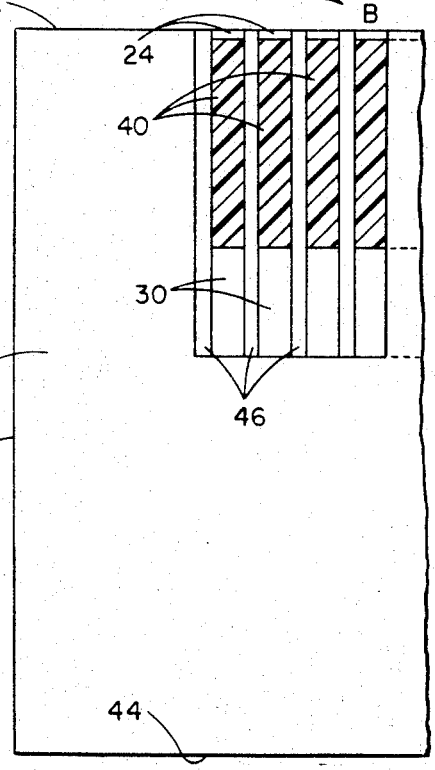

FIGURE 1b is a cross-sectional view of the double head configuration which is illustrated in FIGURE 1a taken along the line B—B. The head section 17 thus illustrated between the surfaces 42 and 44, shows the supporting structure 16 which holds the C-shaped core portions that are indicated by their pole faces 24 and the surfaces 30. Interleaved with the aforesaid core portions, shielding foils 46 are positioned. In a preferred embodiment each foil may consist of alternate laminations of a Hy Mu material and a high conductivity material. The potting compound 40 is seen to fill the voids between the pole faces 24 and the base of each core position 20, between successive shields 46. It will be understood that in actual practice some space is taken up by the winding 34 which is positioned on the C-shaped core position 20. Thus, the presence of the winding may cause a space to appear between a core and its adjacent pair of shields. Such space is minimized by undercutting the shields adjacent the C-core portions to allow for the added thickness. In any event the space is filled by the potting compound which is applied under pressure as hereinafter explained.

The fabrication of the read-after-write head illustrated in FIGURE 1 occurs, in accordance with the present invention, by separately providing a pair of head sections for each head, i.e. the C-core head section 17 and the return core head section 19, which are then assembled. Since the fabrication of these two head sections may occur in substantially the same manner, it is described and illustrated hereinbelow only for the return core section.

FIGURE 2 illustrates the stock from which the supporting structure is fabricated, which is seen to consist of a block of the aforesaid aluminum alloy, having a generally rectangular cross-section. In order to condition the raw stock for the subsequent manufacturing steps, it is subjected to a solution heat treatment wherein the block is maintained at a temperature between 960° Fahrenheit and 980° Fahrenheit for approximately sixty minutes. Immediately thereafter the block is quenched in cold water. The aforesaid solution heat treatment makes the aluminum alloy malleable to avoid shattering, fractures, or high resistance joints as a consequence of the subsequent stamping operation which must be carried out within thirty minutes after quenching.

The stamping operation is illustrated in FIGURE 3 and is carried out by driving a punch 50 in the direction of the arrow into contact with the surface 52 of the block 18. The effect of driving the punch into the surface 52, is to produce a cavity 54 in the latter which has a depth less than the thickness of the block 18. The vertical as well as the beveled side walls of the cavity conform precisely to the corresponding surfaces of the punch 50. It will be noted from FIGURE 3 that this is not the case in the vicinity of the surface 52 which is distorted and rounded near the edge of the cavity 54.

The distortion is shown more clearly in FIGURES 4a and 4b, as indicated by the reference numerals 56 and 60. It will be noted that, as a result of the preceding solution heat treatment, no fractures appear around the edge of the cavity 54. If an edge of the cavity lies sufficiently close to a surface of the block 18, a bowing-out of the block surface may be observed, as shown at 64 and 66 in FIGURES 3 and 4b, which is due to the displacement of the metal by punch 50. From FIGURES 4a and 4b it also appears that the metal is pushed out from the bottom surface 68 of the block 18.

Following the stamping operation, the block 18 is machined to remove the excess metal, the finished supporting structure being illustrated in FIGURES 5a and 5b. It will be noted that the surface 52 has been machined down to a point where the vertical side walls of the cavity 54 intersect it at right angles and the rounded edges 56 and 60 have been removed. Likewise, the surface 68 has been machined flat so that it, as well as the surface 52, lie parallel to the flat bottom surface 70 of the cavity 54. The supporting structure 18 now has a predetermined thickness and the surface 70 lies at a predetermined depth below the surface 52 so as to accurately conform to the outline of the return cores which are subsequently positioned in the cavity.

Following the foregoing machining step, locating indicia in the form of a pair of locating holes 72 and 74 are provided in the supporting structure 18. As shown in FIGURE 6, this step is effected by the use of a drill jig 76, which has a boss 78 that accurately conforms to the cavity 54 in the supporting structure. The jig 76 further contains a pair of bores 72a and 74a which, when the boss 78 engages the cavity 54, serve to locate the precise position relative to the cavity for drilling the locating holes 72 and 74 respectively.

As shown in FIGURE 7, by reversing the drill jig 76, the bores 72a and 74a may be further employed to drill a pair of holes 72' and 74' in the inter-head shield 14. The spacing of the holes 72' and 74' is thereby accurately determined to be the same as that of the locating holes in the supporting structure 18.

Once the supporting structure 18 for the return cores 22 has been machined and the locating holes have been drilled therein, the return core portions 22 may be assembled in the cavity 54. As illustrated in FIGURE 8, the cores are alternately stacked with inter-core shields 78 which are substantially identical in composition with the shields 46 that are used between the C-shaped core portions 20. It will be noted that each of the preformed return cores 22 includes a slot 80 which is absent in the shields 78.

Prior to assembly, the wall of the cavity 54, as well as the core portions 22 and the shields 78, are painted with an adhesive. The cores and shields are then alternately stacked within the cavity 54 whose side walls accurately conform to the outline of the core portions and the shields. During the stacking process, sufficient heat is applied to the supporting structure to maintain the adhesive in a viscous state i.e. to cause it to flow. For certain adhesives, e.g. EC 1386 made by Minnesota Mining and Manufacturing Company, ordinary room temperature is sufficient. The surface defined by the shields 78 and the core portions 22, inclusive of the hole faces 26, is substantially flush with the surface 52 of the supporting structure 18.

Upon completion of the stacking process, the now assembled return core head section 19 is placed into an oven in order to cure the adhesive. In conventional manner the curing process may be carried out in a vacuum chamber while a compression pad, e.g. made of silicone rubber, completely covers the top of the cavity to apply pressure to each stacked component. A machining step follows the curing process in order to remove any adhesive which may have been forced out of the cavity and to provide the head section with a precisely determined thickness and with a continuous planar surface 52 that is common to the pole faces 26 and the surfaces 30 of the core portions 22.

The above-described process is the same for fabricating both return core head sections and such steps as curing, stamping, drilling etc. may of course be carried out simultaneously or successively for both head sections as dictated by considerations of efficiency and convenience. As previously explained, the write and read heads are substantially identical, with the exception that the cores of the write head are somewhat thicker than those of the read head. In order to keep the center-to-center spacing of the channels the same in both heads, this difference is compensated for by the inter-core shields in the write head which are correspondingly thinner than those of the read head.

Each surface 68 of both return core head sections is then painted with an adhesive, as are both surfaces of the laminated inter-head shield 14. The pair of return core sections is then assembled in back-to-back relationship on opposite sides of the shield 14 to form a double head section, as shown in FIGURE 9. The alignment of the pair of head sections is effected by means of the above-mentioned locating holes and cooperating dowel pins 72a and 74a. The pair of locating holes 74 in the respective head sections and the locating hole 74' in the inter-head shield 14 are all engaged by the dowel pin 74a. Similarly, the pair of locating holes 72 and the locating hole 72' are aligned by means of the dowel pin 72a. It will be understood that the center lines of the return core portions 22 are now aligned with each other.

Following the assembly of the respective head sections and the intermediately positioned shield 14 into a double head section designated by the reference numeral 82, the applied adhesive is cured by the application of heat in a vacuum chamber, substantially in the manner described above in connection with the stacking of the cores and shields in the cavity 54. Since the thickness of the shield 14, as well as that of the respective return core head sections 19, was precisely predetermined, the spacing of the surfaces 52 from each other is likewise predetermined. As will be seen hereinbelow, the respective read and write head gaps are not only aligned with each other as a consequence of the above-described technique, but their spacing from each other is precisely predetermined.

During the machining of the individual head sections 19 following the vacuum impregnating process, the excess adhesive is removed from the surface 52 but not from the slots 80 in the core portions 22, which still retain the cured adhesive. Following the vacuum impregnation of the double head section 82, the excess metal of the supporting structure and of the shield 14, together with any overflow adhesive, are machined off. As shown in FIGURE 10, all material above the core portions 22 is removed. Additionally, a pair of transverse slots 80' is machined into the surface 52 of the double head section, which substantially re-establish the original slots 80 in the core portions 22 and which further cut into the intermediately positioned inter-core shields 78. A pair of planar pole face surfaces 26' is thus established, in line with the surfaces 52. With the slots 80' as a standard, a reference surface 84 is machined at the bottom of the double head section 82 spaced a predetermined distance from the slots, and at right angles to the surfaces 52.

For the sake of explaining the present invention, let it be assumed that the C-core head sections 17 are fabricated in a conventional manner by using a preformed comb-like supporting structure. Allowance must obviously be made for the fact that the C-core portions 20 carry windings 34 whose ends must be threaded through the sleeves 36. The latter may contain a solder wire so that, upon the application of heat, the winding ends will be soldered to the sleeves. Once assembled, each of the head sections 17 has its top surface machined down to the C-core portions 20. A transverse slot 80" is precision-ground into the surface 86 of each head section 17, in substantially the same manner as the slots 80' were machined in the double head section 82. A pole face surface 24' is thus established in each head section 17, in line with the surface 86. A reference surface 84' is precision-machined on each head section 17, at the same distance from the slot 80" as the corresponding reference surface 84 appears from the slots 80' and at right angles to the surface 86.

Figure 11:
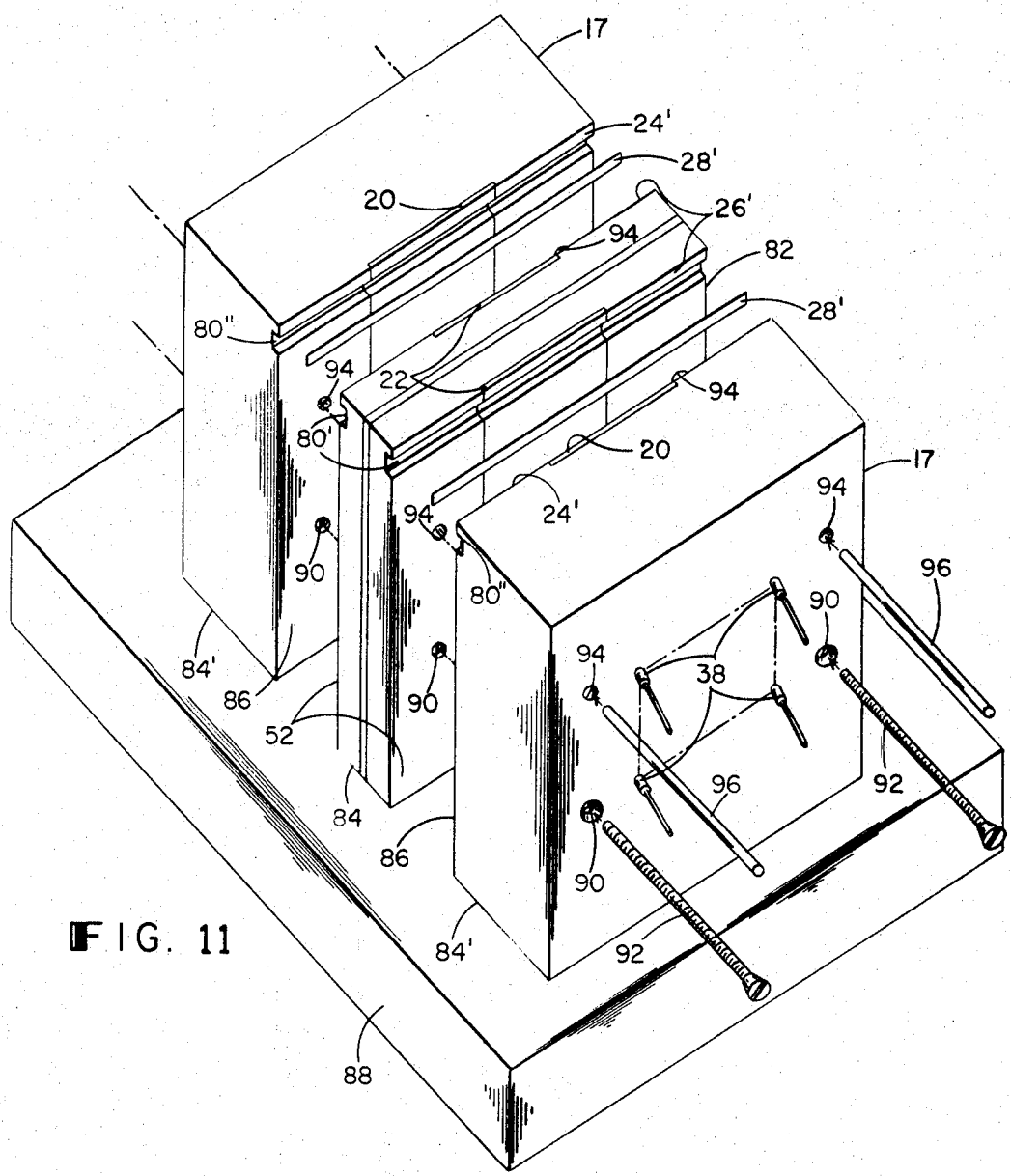
FIGURE 11 illustrates the assembly of the respective head sections into a double head configuration.

As shown in FIGURE 11, the respective head sections are now ready to be assembled with the surfaces 86 and 52, and the mating pole face surfaces 24' and 26' respectively, facing each other. The assembly operation is carried out on a flat planar surface 88 on which the respective head sections are positioned. Since the respective head section reference surfaces 84 and 84' are in contact with the surface 88, the transverse slots 80' and 80" are at the same height and no relative vertical alignment of the head sections is required.

The head sections are moved together so that the surfaces 86 and 52 and the pole face surfaces 24' and 26' contact each other. In each case, the C-core head sections 17 are aligned for a best fit relative to the double head section 82, as visually determined by viewing the core portions 20 and 22 from above. Such visual determination may include the use of a microscope in order to obtain greater precision alignment. When the best fit has been determined, i.e. when the center lines of the respective core sections most nearly match, the head sections are clamped together by external clamping means, not shown. A pair of holes is drilled through all of the clamped head sections and is tapped and countersunk to accommodate a pair of clamping screws 92. The external clamping means are then released and the respective head sections are re-aligned as before to allow for any shifting that may have taken place during the drilling operation. Thereafter, the head sections are clamped together using the clamping screws 92. In the re-clamped, aligned position of the head sections, a pair of bores 94 is drilled and precision-reamed to accommodate a pair of dowel pins 96 extending through all of the head section.

The blocks are then unclamped by removing the clamping screws 92 and any burrs, which may have appeared on the contacting surfaces 52 and 86 due to drilling, are removed. A pair of thin mica spacers 20' is then positioned between the respective pole face surfaces 24' and 26' and the head sections are again moved together with the dowel pins 96 inserted in the bores 94 to align them. The presence of each spacer 28', due to their dimensions, leaves the relationship of the respective surfaces substantially unchanged, so that the surfaces 52, 86, 26' and 24' may be considered as lying in a common plane. The head sections are then finally clamped by means of the clamping screws 92 to form the double head configuration.

Thereafter, the exterior side surfaces of the double head configuration, which contain the protruding winding leads, surrounded by their brass sleeves and the insulating jackets 38, are coated with a wax, or with a room temperature vulcanizer which essentially consists of a polymerizable liquid rubber. Subsequently, the double head configuration is totally immersed in a potting compound which is applied by the aforementioned vacuum impregnation process, followed by curing upon the application of heat. In this manner, all the voids of the double head configuration, such as the space formed by transverse slots 80' and 80", are filled. The room temperature vulcanizer coating, now covered by the potting compound, is subsequently stripped off and the excess potting compound is removed by machining. In the preferred embodiment of the invention, a continuous arcuate surface 42 (see FIGURE 1a) is then machined on the top of the double head configuration, followed by lapping to provide a mirror finish. Any excess metal along the sides of the double head configuration is also removed at this time.

As explained above, the mating core portions of the respective head sections are visually aligned with each other during the assembly of the head sections into a double head configuration, to obtain a best fit. While the thickness of the cores and of the interposed shields may be precisely predetermined, variations will occur due to varying thickness of the adhesive layers. These variations generally present no problem in relatively narrow magnetic heads which are adapted to operate with a magnetic medium that is of the order of one-half inch wide. Such errors may, however, be cumulative and they may exceed tolerable limits when the number of data channels, and hence the number of corresponding cores, is appreciable. In such a case, reference locations must be provided within the cavity 54 which will accurately establish the location of the cores at intermediate points along the length of the cavity.

Figure 12A:
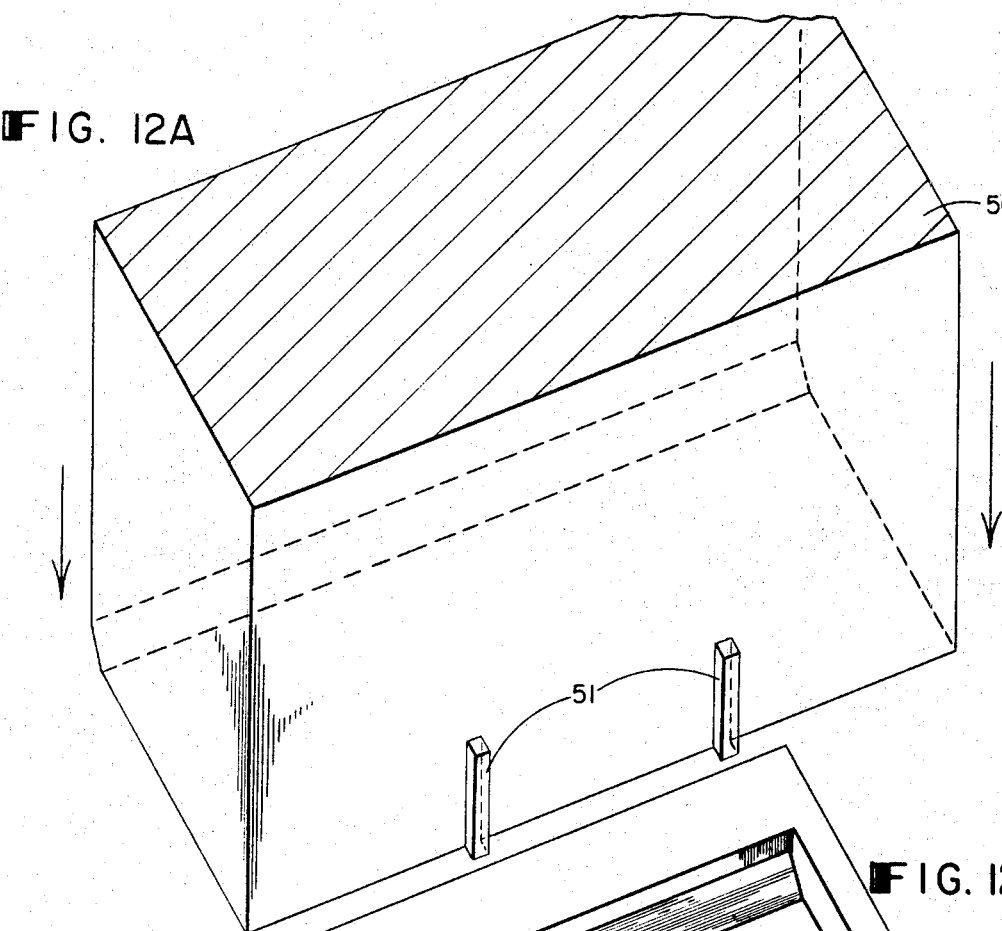
FIGURE 12 illustrates a modification of the stamping operation for large cavities.
Figure 12B:
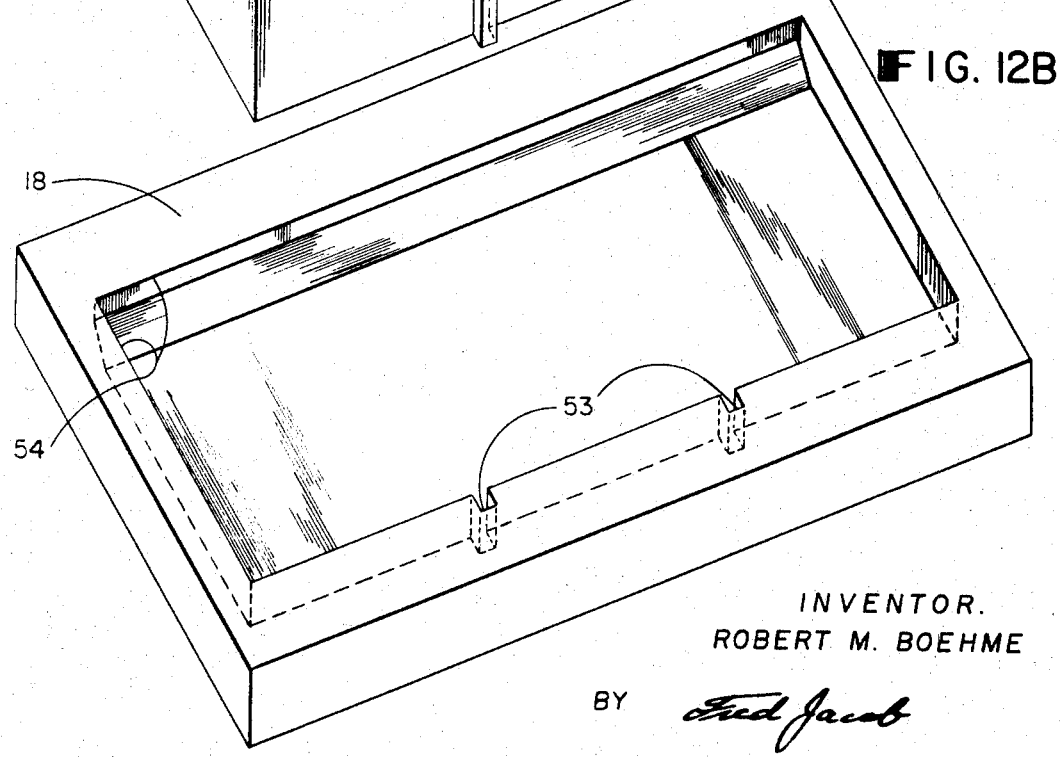

To this end, as shown in FIGURES 12a, a punch may be provided with ribs 51 that are square or rectangular in cross-section. Thus, when the block 18 is stamped with the punch, corresponding grooves 53 will be provided in a sidewall of the cavity 54. These grooves are adapted to hold oversized cores or shields, or both, which will in any event be precisely located a predetermined distance along the length of the cavity 54. In this manner cumulative errors in stacking the core portions and the interleaved shields are prevented. If desired, the punch 50 may also have a similarly cross-sectioned rib on its bottom surface so as to provide a corresponding groove in the flat bottom of the cavity 54.

From the foregoing disclosure, it will be seen that the present invention provides an advantageous method of fabricating a double head configuration in a manner that is considerably less expensive than was heretofore possible and which is capable of providing far more predictable results on a repetitive basis. Specifically, the stamping process and the subsequent machining serve to provide a supporting structure with accurately determined walls which permit substantially no variations in the subsequent positioning of the cores. This contrasts advantageously with the technique heretofore in use wherein comb-like supporting structures were fabricated partly by machining and partly by building them up. Such a method is not only expensive for being more time-consuming and requiring greater fabricating skills, but it is also subject to variations in the finished product which do not occur in the stamping process.

Of great importance in the present invention is the provision of locating indicia referenced to the accurately determined side wall of the cavity in the supporting structure. By means of these locating indicia, the return core head sections are assembled in a predictably aligned relationship to serve as a reference for alignment relative to the C-core head sections. In the technique heretofore in use, a cut-and-try alignment method is required, which is rendered more difficult by the intermediately positioned shield and supporting structure.

The supporting structure 16 of the C-core head section 17 requires a deeper cavity and one which must accept a core having a more complex configuration. In this connection it is pointed out that the C-core portion 20 need not necessarily include the L-shaped extension at its lower end, which is illustrated in FIGURE 1, and which is primarily useful for positioning purposes. Under certain conditions, it may be advantageous to fabricate the C-core head section in a conventional manner and to align it with the double head section as discussed hereinabove. The relative alignment of each C-core head section with its mating return core head section presents less difficulties owing to the fact that it can be carried out with the respective core portions in contact with each other to aid a visual comparison.

Significant economies can be effected, however, if the head sections 17 are fabricated by using the stamping process. Most importantly, locating indicia may be accurately established with reference to the stamped cavity in each C-core head section, in substantially the same manner as is done in the fabrication of the return core head sections. For example, the bores 94 (FIGURE 11), may become common locating indicia referenced to the cavity side walls which, when aligned by the dowel pins 96, will cause all core portions to be mutually aligned. The holes 90 may be drilled at the same relative to the cavity side walls and subsequently tapped. In this manner, the return core sections need not first be separately assembled into a double head section and the cut-and-try process described above for visually obtaining a best fit between mating core portions can be dispensed with. The gap spacer 28' can then be immediately positioned between the pole face surfaces 24' and 26' when the respective head sections and the laminated shield 14 are initially assembled and clamped in aligned relationship by the clamping screws 92.

From the foregoing disclosure of the present invention, it will be apparent that variations of the disclosed method will occur where modifications of the double head configuration are called for. For example, such modifications may require the use of substitute materials, e.g. beryllium copper for the supporting structure in place of an aluminum alloy, or they may call for changes in the physical configuration, e.g. the use of a double-arcuate surface with a central discontinuity in place of the common arcuate surface 42.

Numerous modifications and departures of the disclosed method will now occur to those skilled in the art, together with various substitutions of certain steps for others and the addition or omission of still other steps, all of which clearly fall within the true spirit and scope of the present invention.

What is claimed is:

1. The method of fabricating a doublehead configuration consisting of a magnetic write head and read head respectively, having like pluralities of aligned magnetic cores for writing information in a plurality of channels of a magnetic medium and for reading said information subsequent to writing, said magnetic cores being substantially alike in the respective heads but having greater thickness in said write head, each of said cores including a wound C-shaped core portion and a mating return core portion, comprising the steps of:

forming a pair of separate C-core head sections and a pair of separate return core head sections by assembling corresponding core portions of each head, interleaved with non-magnetic core shields, in a preformed, non-magnetic metallic supporting structure, with the pole faces of said core portions aligned in a common plane in each of said head sections, forming an integral doublehead section by assembling the two return core head sections back-to-back with an interposed laminated shield and mutually aligned by using a preformed position reference of said supporting structure, machining a shallow transverse groove into the common plane of each head section immediately below said pole faces, machining a reference surface on each head section identically positioned with respect to said groove and perpendicular to the pole face thereof, positioning said doublehead section between said C-core head sections with said reference surfaces stationed on a common planar surface, clamping said positioned head sections together with mating pole faces facing each other, aligned for a best match along the center lines of said core portions, machining permanent clamping and position reference means on all of said head sections, unclamping said head sections and positioning a non-magnetic gap spacer between each pair of said common planes opposite said pole faces, re-clamping said head sections in aligned relationship by using said permanent clamping and reference means to form a doublehead configuration, impregnating said doublehead configuration with a potting compound, and grinding a common arcuate surface on said doublehead configuration adapted to be presented to a magnetic medium.

2. The method of claim 1 wherein the assembly of at least said two return core head sections comprises the steps of:

taking a pair of generally rectangular, nonmagnetic metal blocks and subjecting them to a solution heat treatment by maintaining a first specified temperature for a first period and subsequently quenching the blocks in water, stamping one surface of each of said blocks with a punch within a predetermined time interval after said quenching step to a depth less than the thickness of said block, said punch being shaped to provide a cavity in each block having a flat bottom and side walls which accurately conform to the outline of said assembled return core portions and their corresponding shields, age-hardening said blocks by maintaining them at a predetermined second temperature for a specified second period, grinding said block to a predetermined thickness with the cavity-containing block surface flat and parallel to its opposite block surface and to said cavity bottom, drilling a pair of locating holes in each block accurately located with respect to said cavity side walls, coating said cavity, said return core portions and their corresponding shields with an adhesive, forming said return core head sections by stacking alternate layers of said return core portions and said interleaved shields side by side in each cavity while applying sufficient heat thereto to maintain said adhesive in a viscous state, impregnating said return core head sections with said adhesive, curing said adhesive by the application of heat to said return core head sections, precision-machining said cavity-containing block surface of each return core head section to form said common plane a predetermined distance from said opposite block surface and parallel thereto, drilling a pair of locating holes in said laminated shield spaced the same distance from each other as said locating holes in said return core head sections, coating said laminated shield and said opposite block surfaces with an adhesive, positioning said return core head sections by the use of said locating holes with said opposite block surfaces abutting opposite sides of said shield to form said integral doublehead section, impregnating said doublehead section with said adhesive, and curing said last-recited adhesive by the application of heat.

3. The method of claim 2 wherein said punch has at least one rib to provide an intermediate locating groove in a wall of said cavity, said step of stacking alternate layers of said core portions and said shields in said cavity including the step of positioning at least one enlarged layer in said cavity adapted to engage said groove.

4. The method of fabricating a data transfer device comprising a pair of magnetic heads fixed in spaced aligned relationship relative to each other, said heads including like pluralities of cores composed respectively of first and second abutting core portions having their pole faces aligned in a common plane in each head, comprising the steps of:

preforming first and second core supporting structures for each head each adapted to hold identical core portions in a cavity thereof, the preforming process of at least said first core supporting structures including stamping a metal block with a punch to provide said cavity in one surface thereof, said cavity extending to a depth less than the thickness of said block and having walls which accurately conform to the outline of the core portions to be held therein, and machining said block to a predetermined thickness to render said one block surface and its opposite surface flat and parallel to the bottom of said cavity, providing locating indicia on each block accurately positioned with respect to said cavity walls, forming separate head sections by stacking and affixing in each cavity pluralities of conforming core portions in alternation with non-magnetic shields, machining said one surface of each head section to provide said common plane, positioning the indicia-bearing head sections, aligned by said indicia, in back-to-back relationship with respect to each other on opposite sides of a laminated shield and affixing them thereto to form a double head section, aligning each of the remaining head sections with respect to said double head section, and assembling said aligned head sections into said data transfer device with non-magnetic spacing material positioned between said pole faces.

5. The method of fabricating a data transfer device comprising a pair of multi-core magnetic heads positioned in fixed mirror-image relationship with respect to each other, comprising the steps of:

preforming first and second core supporting structures for each head with cavities to hold corresponding first and second separate portions respectively of the magnetic cores in each head, said preforming operation of at least said pair of first supporting structures including the step of stamping a pair of blocks with a punch to form identical cavities precisely conforming to the core portions to be held therein and having a depth less than the thickness of said block, machining each of said blocks to a predetermined uniform thickness greater than the depth of said cavity to form said supporting structure, forming locating indicia on each of said supporting structures identically positioned relative to said cavity, forming respective head sections, each including a pole face surface, by permanently assembling identical core portions, interleaved with shielding material, in the conforming cavities of the corresponding supporting structures, permanently assembling the pair of indicia-bearing head sections in back-to-back relationship, aligned by said indicia, on opposite sides of an intermediately positioned laminated shield to form a double head section, permanently assembling the remaining head sections on opposite sides of said double head section and in aligned relationship therewith to form a double head configuration having core gaps lying in a common plane in each head, said last recited step including positioning a non-magnetic spacer between each pair of said pole face surfaces, and machining said double head configuration to form a surface, including said gaps, adapted for presentation to a magnetic medium.

6. The method of claim 5 wherein the preforming operation of said pair of first supporting structures includes the steps of:

subjecting said blocks to a solution heat treatment no more than a predetermined time interval prior to stamping, and age-hardening said blocks following said stamping step.

7. The method of claim 6 wherein said supporting structures consist of an aluminum alloy, said solution heat treatment comprising the steps of:

maintaining said blocks at a temperature from 960° F. to 980° F. for approximately one hour, and quenching said heated blocks in water immediately thereafter and no more than thirty minutes prior to said stamping step, said age-hardening treatment comprising the step of maintaining said blocks at a temperature from 345° F. to 355° F. for approximately eight hours.

8. The method of claim 5 wherein the formation of said head sections comprises the steps of:

coating said block cavities and corresponding core portions and shielding material with an adhesive, applying sufficient heat to the component parts of said head sections during the assembly process to maintain said adhesive in a viscous state, and curing said adhesive by the application of heat thereafter.

9. The method of claim 5 wherein the formation of said locating indicia includes the steps of: positioning a drill jig in predetermined relationship over each of said supporting structures, said drill jig comprising a plate with a pair of bores and a protruding boss which mates with the cavity in said supporting structure, and drilling through said bores into said supporting structure to form locating holes in the latter accurately referenced to said cavity.

10. The method of claim 9 wherein the assembly of said indicia-bearing head sections comprises the steps of:

drilling a pair of locating holes in said laminated shield spaced the same distance from each other as the locating holes in said head sections, coating the contacting surfaces of the component parts of said double head section with an adhesive, positioning said component parts in aligned relationship with each other by the use of a pair of dowel pins which engage said locating holes, and curing said adhesive by the application of heat.

11. The method of claim 5 wherein the assembly of said double head section with said remaining head sections to form said double head configuration comprises the steps of:

machining a shallow transverse groove below the pole face surface of each head section, machining a reference surface on each head section at right angles to the plane of said pole face surface and identically located in each head section relative to said groove, aligning and externally clamping said head sections with respect to each other, with said pole face surfaces facing each other while said reference surfaces are positioned in a common planar surface, machining a pair of screw holes extending through all of said head sections, unclamping said head sections, re-aligning said head sections relative to each other and re-clamping them with screws engaging said screw holes, machining a pair of dowel pin holes extending through all of said head sections, unclamping said head sections, positioning said non-magnetic spacers between each pair of said facing pole face surfaces, re-aligning said head sections by means of dowel pins engaging said dowel pin holes, and re-clamping said head sections by means of said screws.

12. The method of fabricating a data transfer device comprising a pair of multi-core magnetic heads positioned in fixed mirror image relationship with respect to each other, comprising the steps of:

pre-forming first and second core supporting structures for each head with cavities to hold corresponding first and second separate portions respectively of the magnetic cores in each head, said pre-forming operation including the stamping of first and second blocks for each head with a punch to form cavities precisely conforming to the respective core portions to be held therein and having a depth less than the thickness of said block, machining each of said blocks to a predetermined uniform thickness greater than the depth of said cavity to form said supporting structure, forming locating indicia on each of said supporting structures identically positioned relative to said cavity, forming first and second head sections respectively for each of said magnetic heads by permanently assembling identical core portions, interleaved with shielding material, in the conforming cavities of the corresponding supporting structures, each of said head sections including a pole face surface, permanently assembling all of said head sections into a unitary structure aligned by said indicia and positioned in said mirror image relationship with respect to a laminated shield located proximately between said second head sections, said last-recited assembly operation further including the step of positioning a non-magnetic spacer between the facing pole face surfaces of each pair of said first and second head sections respectively to form core gaps lying in a common plane in each head, and machining said assembled head sections to form a surface, including said gaps, adapted for presentation to a magnetic medium.

13. The method of claim 12 wherein the formation of said locating indicia comprises the steps of:

positioning a pair of drill jigs in predetermined relationship over each of said supporting structures, each of said drill jigs comprising a plate having a protruding boss which accurately mates with the cavity in each of a pair of identical supporting structures, said drill jig plates each further containing bores identically positioned relative to said boss, drilling through said bores in said plate into each supporting structure to form locating holes in the latter accurately referenced to said cavity, drilling locating holes in said laminated shield spaced identically to the locating holes in said head sections, tapping at least a pair of corresponding locating holes in said supporting structures and said laminated shield, positioning said head sections in aligned relationship with each other by the use of dowel pins engaging the remainder of said locating holes, positioning said gap spacers between said facing pole face surfaces, and clamping all of said head sections together by means of clamping screws engaging said tapped holes.

References Cited

UNITED STATES PATENTS

| | | | |
|---|---|---|---|
| 3,065,311 | 11/1962 | Kornel. | |
| 3,222,461 | 12/1965 | Wood et al. | 179—100.2 |
| 3,082,509 | 3/1963 | Lawrance | 29—60 |
| 3,195,119 | 7/1965 | Worost | 179—100.2 |
| 3,238,603 | 3/1966 | Curtis et al. | 179—100.2 |
| 3,242,556 | 3/1966 | Broughton | 29—60 |
| 3,357,097 | 12/1967 | Schulte | 29—60 |
| 3,120,696 | 2/1964 | Lubkin | 29—60 |

JOHN F. CAMPBELL, *Primary Examiner.*

D. C. REILEY, *Assistant Examiner.*

U.S. Cl. X.R.

179—100.2; 340—174.1